(12) United States Patent
Martin

(10) Patent No.: US 8,819,495 B2
(45) Date of Patent: Aug. 26, 2014

(54) APPLICATION HARNESSING SYSTEM AND METHOD

(75) Inventor: Brian Martin, Moraga, CA (US)

(73) Assignee: WaveMarket, Inc., Emeryville, CA (US)

( * ) Notice: Subject to any disclaimer, the term of this patent is extended or adjusted under 35 U.S.C. 154(b) by 169 days.

(21) Appl. No.: 13/399,795

(22) Filed: Feb. 17, 2012

(65) Prior Publication Data

US 2013/0219228 A1    Aug. 22, 2013

(51) Int. Cl.
*G06F 11/00*    (2006.01)
(52) U.S. Cl.
USPC .......................................... 714/38.1; 717/124
(58) Field of Classification Search
USPC ........... 714/22, 38.1, 38.15, 45; 717/124, 126
See application file for complete search history.

(56) References Cited

U.S. PATENT DOCUMENTS

| | | | |
|---|---|---|---|
| 6,434,364 B1 * | 8/2002 | O'Riordain ................ | 455/67.11 |
| 7,627,312 B2 * | 12/2009 | Varadarajan et al. ......... | 455/423 |
| 8,065,554 B2 * | 11/2011 | Herscovitz et al. ............ | 714/4.1 |
| 8,423,014 B2 * | 4/2013 | McGregor et al. ............ | 455/425 |
| 2012/0278268 A1 * | 11/2012 | Hamalainen et al. ........... | 706/46 |

* cited by examiner

*Primary Examiner* — Yolanda L Wilson
(74) *Attorney, Agent, or Firm* — Dovas Law, P.C.

(57) ABSTRACT

Automated testing of application software is performed by recording the output of at least one sensor that produces sensor information. A harnessed app being tested requests sensor information. Those requests are intercepted and recorded information that corresponds to the requested sensor information is retrieved and sent to the harnessed app as sensor information.

31 Claims, 4 Drawing Sheets

APPLICATION HARNESSING SYSTEM AND METHOD

FIELD OF INVENTION

This invention relates to mobile device testing. More particularly, this invention relates to testing mobile device applications using signals stored in a log file.

BACKGROUND

Mobile devices such as cellular telephones, smart phones, GPS systems, and cellular-enabled personal computers have become very common and very powerful. This combination of ubiquity and capability has created an ongoing demand for even more capable devices and more complex applications.

The power and capabilities of mobile devices are dependent on the availability of various infrastructures. A mobile device operates on a communication network provided by a mobile telephone operator. Such communication networks usually provide not only cellular communication links but "basic" services such as time keeping and access to the public telephone network. In addition, the United States Government operates an easily accessed global positioning system (GPS) as well as ultra-accurate time signals that can be used by communication networks and mobile devices to synchronize signals and operations. A state-of-the-art mobile device, sometimes referred to as a smartphone, can include a wide range of built-in features and capabilities, for example features such as communication ports, touch screen displays, keyboards, on/off sensors, orientation sensors, accelerometers, magnometers, light sensors, proximity sensors, cameras, one or more timers, microphones, audio outputs, memory card readers, internal memory, specialized software, GPS, and capabilities such as programmability, identifying cell towers, ascertaining cell tower signal strengths, identifying WiFi networks, and determining existing battery level (strength).

By using those infrastructures mobile devices can run a wide range of applications ("Apps") that provide functionalities such as telephone communications, electronic texting, data communications, social networking, calendars, alarms, memo and note recording, GPS navigation, location tracking, music (MP3) and video (MP4) playback, video calling, conference calling, movie playback, picture taking and sending, games, emails, audio and video downloading, internet access and browsing, specialized advertising, short range communications such as Bluetooth™, mobile banking, instant messaging and the ever-popular specialized ringtones.

The immense power, speed, and capabilities of mobile devices, the infrastructures that support them, and the applications that orchestrate their interactions and functions create an ongoing problem: how exactly does one go about testing an application running on a mobile device? Testing simple software running on rather simple devices such as microcontrollers that have just a few basic inputs can be challenging, but testing software that interacts with a mobile device, its sensors, and its communication network is simply far more of a challenge.

SUMMARY

The invention relates to testing application software on a system having at least one sensor. Readings from the sensor are read and recorded over a period of time. A harnessed app that is being tested is then run on the system. Requests for sensor information are intercepted and recorded information related to the requested information is retrieved as a first substitute readings. The first substitute reading is sent to the harnessed app as sensor information.

The sensor information can be GPS information, cell location information, WiFi location information, accelerometer information, battery level information, cell ID information, or any other information derivable from one or more sensors.

In another aspect, the invention is computer readable storage media that contains coded instructions to form a device having at least one sensor that produces sensor information. The coded instructions further provide for recording that sensor information over time and then running a harnessed app that is to be tested on the device. At least one request from the harnessed app to obtain sensor information is intercepted and recorded information that corresponds to the requested sensor information is retrieved and sent as a substitute reading to the harnessed app as sensor information.

In another aspect, the invention is a system that includes integrated circuits specifically including memory having a log file, a central processing unit, and at least one sensor that are formed into a computerized system by operating system software. The system further includes a harnessed app that is being tested and a collector app that is disposed between the operating system and the harnessed app. The collector app reads the sensor output over time and records those readings in the log file. The collector app further intercepts requests from the harnessed app to obtain the sensor output, and in response retrieves information from the log file which is then sent to the harnessed app as sensor output.

In yet another aspect, the invention is a system that includes integrated circuits having a log file, a central processing unit, and at least one sensor having at least one sensor output. An operating system forms a computerized system from the integrated circuits. A first app being tested is run and a second app is disposed between the operating system and the first app. The second app records sensor output over time into the log file. The second app intercepts a request from the first app to obtain sensor output, and in response to the request the second app retrieves information from the log file and sends the retrieved information to the first app as sensor output.

BRIEF DESCRIPTION OF THE DRAWING(S)

The foregoing Summary as well as the following detailed description will be readily understood in conjunction with the appended drawings which illustrate embodiments of the invention. In the drawings.

Figure 3:
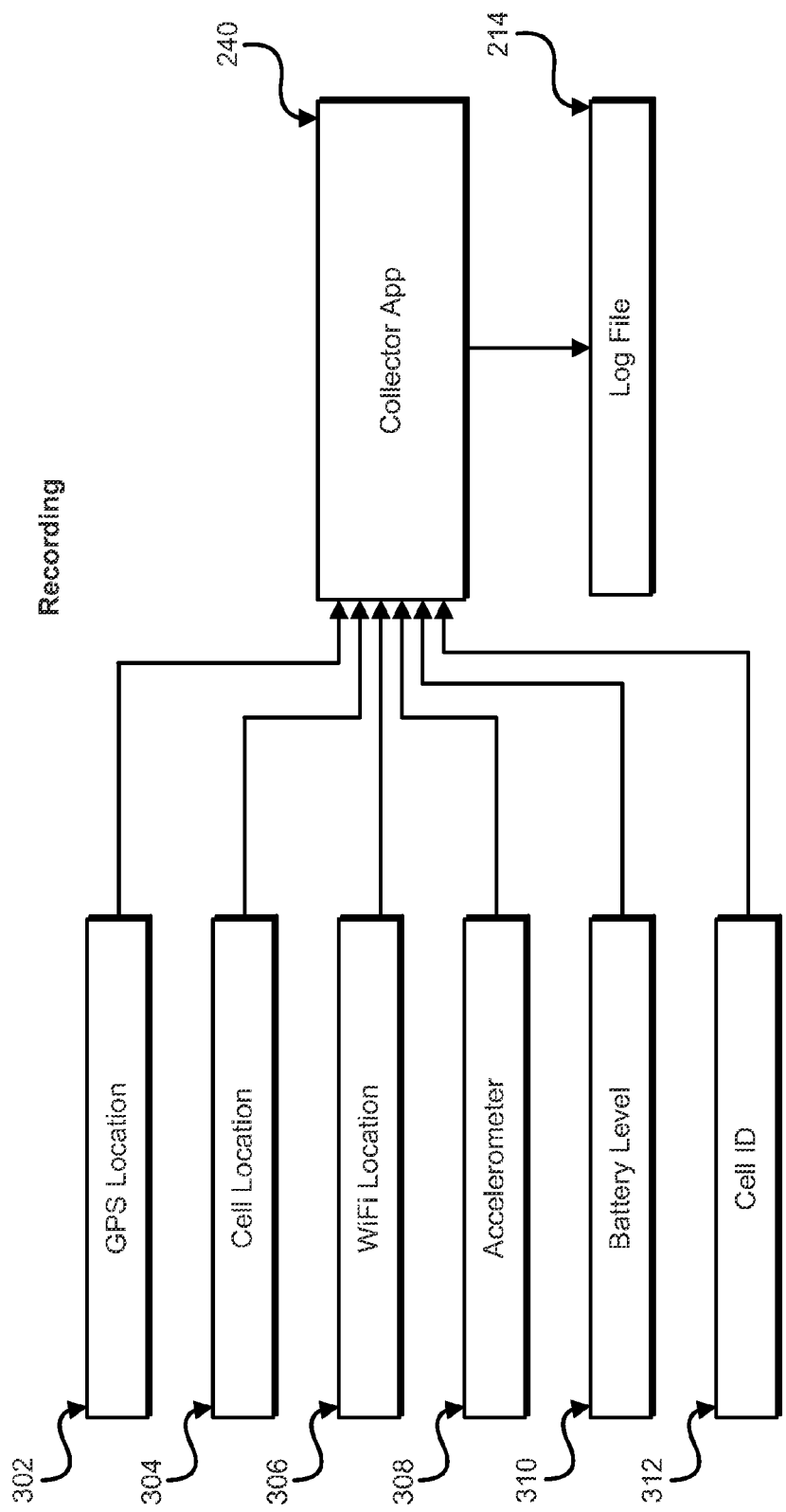
Figure 4:
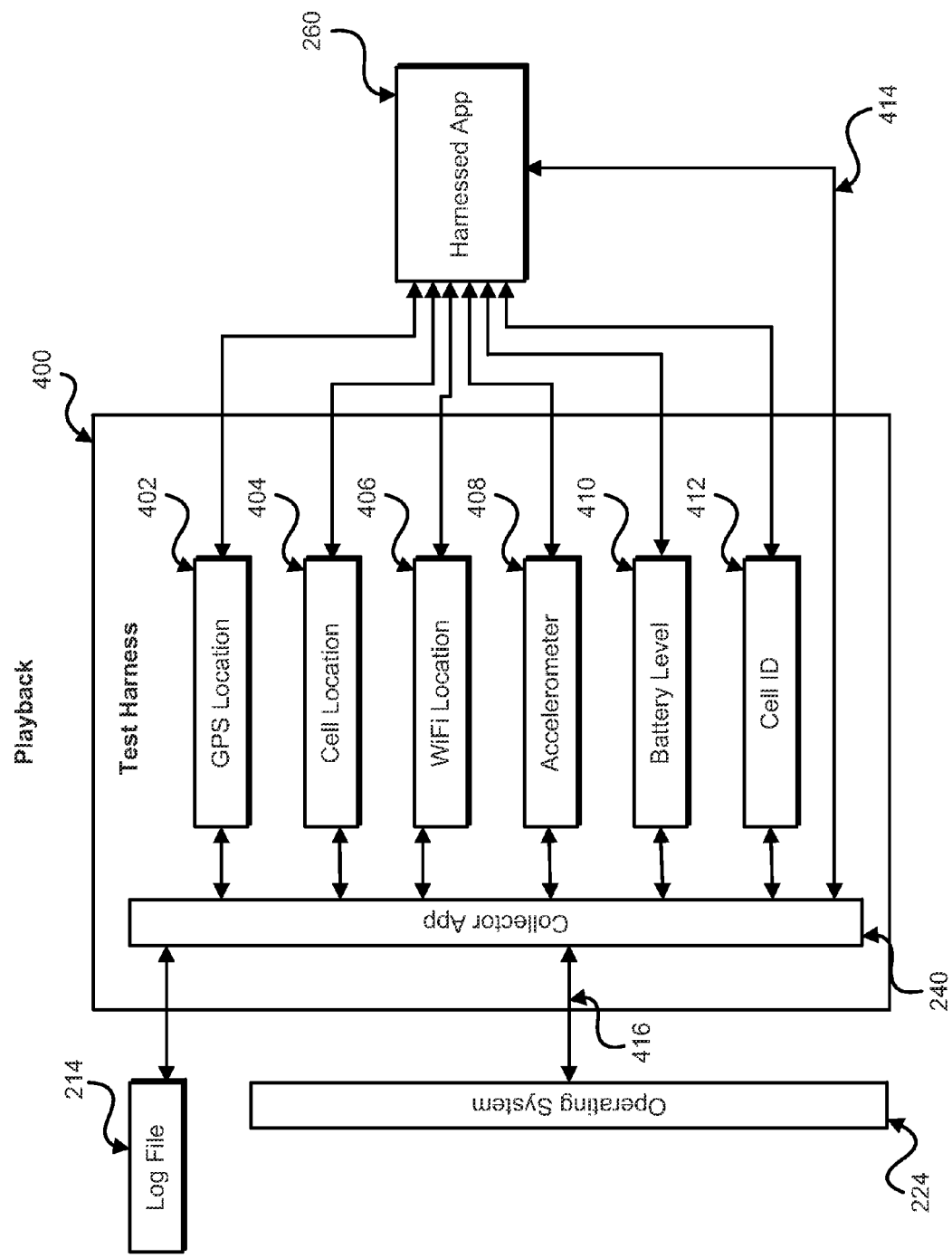

FIG. 3 illustrates the process by which a collector app records information into a log file, where that information relates to the operating conditions of the mobile device over a time period as determined using mobile device sensors; and FIG. 4 illustrates the process by which the collector app plays the information in the log file (recorded in FIG. 3) back into a harnessed app so as to control the information processed by the harnessed app.

DETAILED DESCRIPTION OF ILLUSTRATIVE EMBODIMENT(S)

The disclosed subject matter will now be described more fully hereinafter with reference to the accompanying drawings. It should be understood that this invention may take many different forms and thus the invention should not be construed as being limited to the specific embodiments set forth herein.

In the figures like numbers refer to like elements. Furthermore, the terms "a" and "an" as used herein do not denote a limitation of quantity, but rather denote the presence of at least one of the referenced items. All documents and references referred to herein are hereby incorporated by reference for all purposes.

Figure 1:
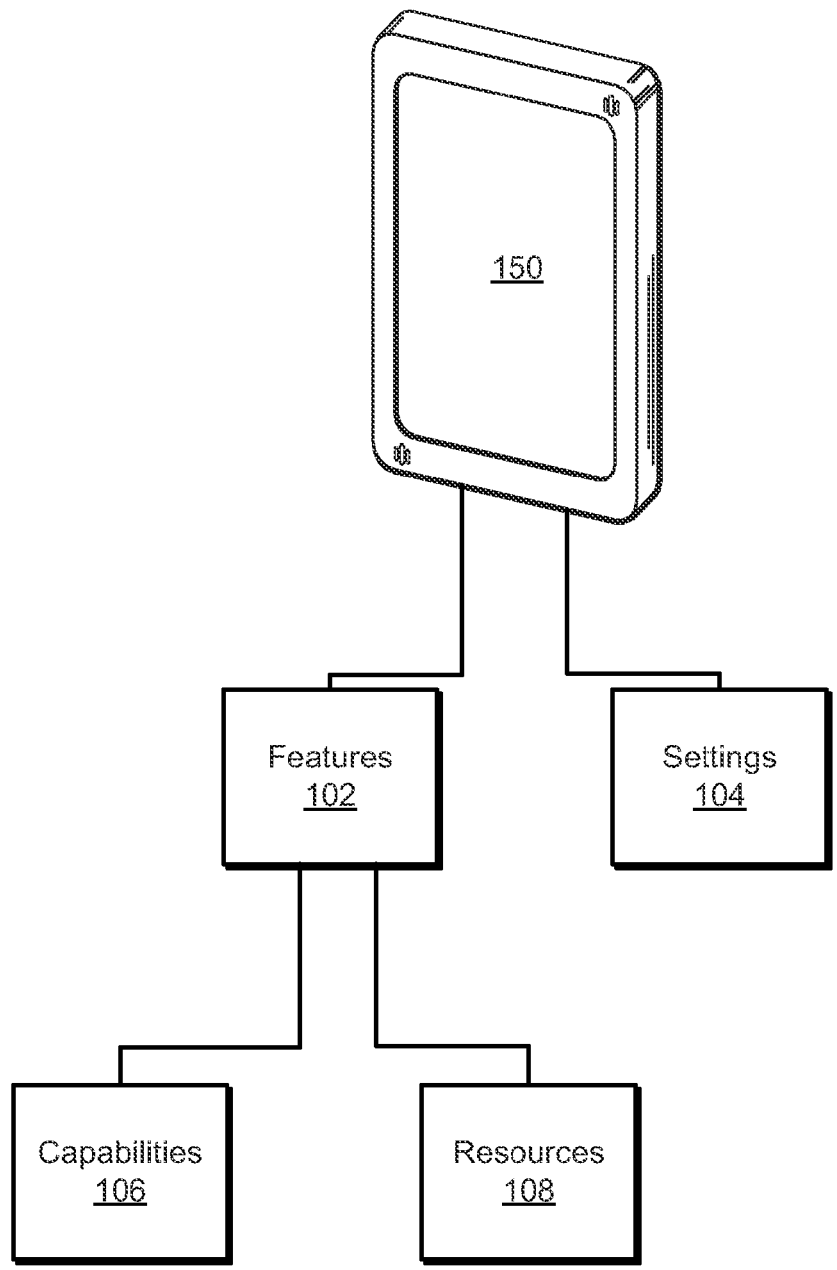
FIG. 1 is a schematic depiction of a prototypical mobile device having a plurality of features, settings, capabilities, and resources and which is suitable for use with the invention.

Refer now to FIG. 1 for a schematic depiction of a prototypical mobile device 150 that is suitable for practicing the invention. The mobile device 150 by design is capable of running a multitude of software applications. The mobile device 150 can be implemented to enable a variety of features 102 using a variety of settings 104 and resources 108 to implement a set of capabilities 106. A user can set up the mobile device 150 by adjusting the settings 104, such as sound levels, visual intensity levels, dates, times, timers, calendars, contact lists, contact groupings, speed dials, tools, and clock settings. In addition, application software can check and/or set up the features 102 and settings 104 to use the resources 108 and capabilities 106 as required to perform its programmed task(s).

The resources 108 of the mobile device 150 include a number of sensors that provide information to the remainder of the mobile device 150 and to application software. Referring now to FIG. 3, in the illustrated embodiment the sensors are suitable for providing GPS location information 302, cell location information 304, WiFi location information 306, accelerometer information 308, battery level information 310, and cell ID information 312. In practice a mobile device 150 is capable of providing additional information, but the foregoing information is sufficient for purposes of explanation.

Figure 2:
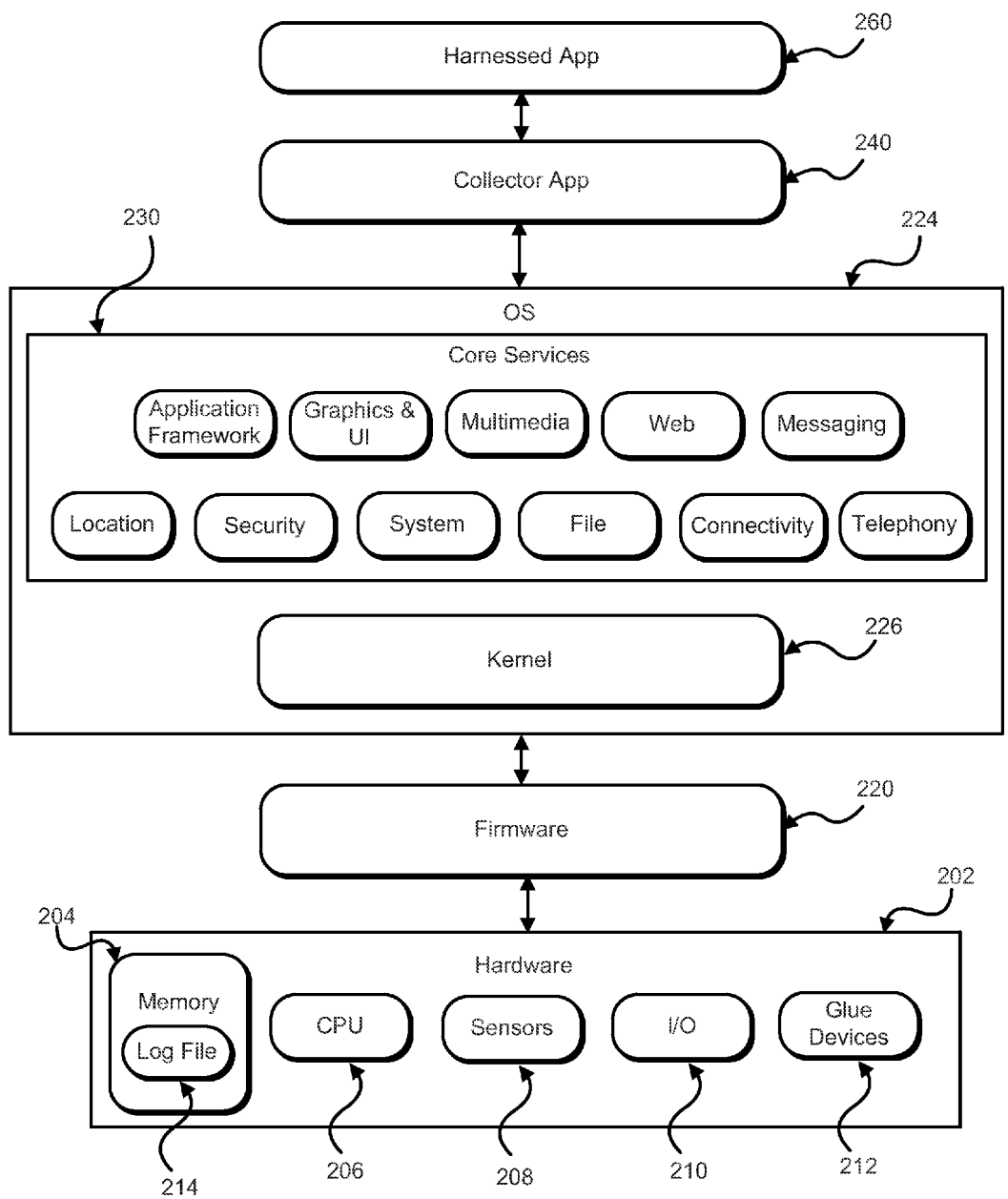
FIG. 2 illustrates the functional hierarchy of a mobile device that is in accord with the invention.

Referring to FIG. 2, the functional operation of the mobile device 150 can be viewed as an abstract hierarchical progression from basic hardware devices to a top level application software. At the lowest level is a collection of basic semiconductor hardware 202 devices, typically integrated circuits. Such semiconductor hardware 202 typically includes memory 204, a central processor unit ("CPU") 206, numerous sensors and their support electronics 208, input/output ("I/O") 210 device support (specifically including display screens and drivers, audio drivers and outputs, RF transceivers, etc.), and glue devices 212 as required to change voltage levels or signal levels and to perform other interfacing as required for proper hardware 202 functionally. Of particular import to the invention, the memory 204 includes a log file 214 whose purpose is described subsequently.

Still referring to FIG. 2, the next level of the abstract hierarchical progression is firmware 220, if required. The firmware 220 is useful for upgrading the mobile device 150, establishing a certain set of functions, limiting or restricting the mobile device's capabilities, and storing non-volatile information (e.g. model number and revision number of the mobile device 150).

Still referring to FIG. 2, moving up the abstract hierarchical progression from the firmware 220 is an operating system 224. The operating system 224 provides a set of software programs that manage the semiconductor hardware 202 and firmware 220 and implement common services for application software. The operating system 224 includes a low-level "kernel" routine 226 that handles basic software integration to the firmware 220 and hardware 202 so as to implement underlying functions. In practice the kernel 226 is seldom modified and is used to form a family of mobile devices. Over the kernel 226 is a set of core services 230 that while still basic may change from time to time or from family device to family device. The core services 230 are software functions that support the on-board services of the mobile device 150.

In the particular example being illustrated, the core services include software routines that support and enable obtaining GPS location information 302, cell location information 304, WiFi location information 306, accelerometer information 308, battery level information 310 and cell ID information 312. However, those particular information types are exemplary only.

Still referring to FIG. 2, overlaying the operating system 224 is a collector app 240 whose operation is described in more detail subsequently, and over the collector app 240 is a software application that is being tested, hereinafter referred to as the harnessed app 260. One feature that is apparent from FIG. 2 is that the collector app 240 is disposed between the operating system 224 and the harnessed app 260. All signals that flow into and out of the harnessed app 260 conceptually pass through the collector app 240.

FIG. 3 schematically depicts the collector app 240 when it is in a record mode recording signals into the log file 214. As shown, the current GPS location 302 is determined by the collector app 240 and is stored in the log file 214. Likewise, the cell location 304, the WiFi location 306, the accelerometer 308 outputs, the battery level 310, and the cell ID 312 are all determined by the collector app 240 and stored in the log file 214. Those signals are monitored and recorded over time. That is, each signal has a set of values that correspond to readings at discrete time intervals. The log file 214 therefore should be understood as recording time-valued signals.

The recorded signals in the log file 214 are not simply a collection of random possible signals; rather, the recorded signals represent signals that are used by the harnessed app 260 to perform its programming instructions. In practice, the recorded signals in the log file 214 match the signals that will be used by the harnessed app 260. To ensure that the recorded signals are realistic, some number of canonical test cases can be generated by performing certain basic actions such as driving or walking a set course.

The harnessed app 260 is an application that is being tested to operate on the mobile device 150. As the harnessed app 260 runs, its results are determined. The problem to be solved is what the results should actually be. To determine that, a set of reference signals is useful. Those reference signals are those recorded in the log file 214.

Referring now to FIG. 4, the harnessed app 260 is conceptually attached to a test harness 400. The test harness 400 is formed by the collector app 240 which, as has been noted, is disposed between the harnessed app 260 and the operating system 224. When the harnessed app 260 runs it requests information. The collector app 240 intercepts those requests, obtains information that corresponds to that request from recorded information in the log file 214, and then feeds the recorded information to the harnessed app 260. So far as the harnessed app 260 knows, the information it requested is current information and not recorded information.

Still referring to FIG. 4, when the harnessed app 260 requests GPS location information, the collector app 240 retrieves GPS location information from the log file 214 and formats it as GPS location 402 information that is applied to the harnessed app 260. Likewise, when the harnessed app 260 requests cell location information, WiFi location information, accelerometer information, battery level information and/or cell ID information, the collector app 240 retrieves appropriate information from the log file 214, and then formats the retrieved information as cell location 404 information, WiFi location 406 information, accelerometer 408 information, battery level 410 information and/or cell ID information 412 that are then applied to the harnessed app 260.

Still referring to FIG. 4, at times the harnessed app 260 might request information that is not stored in the log file 214 but is available by accessing the operating system 224. In such case the collector app 240 receives the request via a bus 414 and then passes it via a bus 416 to the operating system 224. The response from the operating system 224 is then received on the bus 416 by the collector app 240 which then passes the received information via the bus 414 to the harnessed app 260.

The harnessed app 260 thus receives its signals from the test harness 400. Inputs to the harnessed app 260 are controlled to make use of information in the log file 214 instead of from the sensors disposed on the mobile device 150. This enables running the harnessed app 260 using a simulated platform with controllable inputs and which does not require use of sensors. This enables fully automated testing of the harnessed app 260 with simulated signals and further enables automated testing using a test bed without sensors. To do so a log file 214 is created that includes the information needed for the harnessed app 260 run. When the log file 214 is stored on a test bed, the test harness 400 can effectively simulate a mobile device as far as the harnessed app 260 is concerned. The test harness 400 and log file 214 can simulate operation using controlled inputs to the harnessed app 260. Multiple log files 214 can input different information to the harnessed app 260 quickly and easily.

While embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A method of testing mobile application software, the method comprising:
   reading sensor information over a period of time from a system having at least one sensor that produces the sensor information;
   recording the sensor information over a period of time;
   running a harnessed app that is to be tested on the system;
   intercepting at least one request from the harnessed app to obtain sensor information;
   retrieving recorded information that corresponds to sensor information at a first time to produce a first substitute reading for the at least one request; and
   sending the first substitute reading to the harnessed app as sensor information.

2. The method of testing mobile application software according to claim 1, wherein the sensor information is GPS information.

3. The method of testing mobile application software according to claim 1, wherein the sensor information is cell location information.

4. The method of testing mobile application software according to claim 1, wherein the sensor information is WiFi location information.

5. The method of testing mobile application software according to claim 1, wherein the sensor information is accelerometer information.

6. The method of testing mobile application software according to claim 1, wherein the sensor information is battery level information.

7. The method of testing mobile application software according to claim 1, wherein the sensor information is cell ID information.

8. The method of testing mobile application software according to claim 1, further comprising intercepting at least a second request from the harnessed app to obtain sensor information, retrieving recorded information that corresponds to sensor information at a second time to produce a second substitute reading for the at least second request, and sending the second substitute reading to the harnessed app as sensor information.

9. A non-transitory computer readable storage media containing coded instructions to: implement at least one sensor that produces sensor information; read sensor information over a period of time; record the sensor information read over a period of time; run a mobile app that is to be tested; intercept at least one request from the mobile app to obtain sensor information; retrieve recorded information that corresponds to sensor information at a first time to produce a first substitute reading for the at least one request; and send the first substitute reading to the mobile app as sensor information.

10. The non-transitory computer readable storage media according to claim 9, wherein the sensor information is GPS information.

11. The non-transitory computer readable storage media according to claim 9, wherein the sensor information is cell location information.

12. The non-transitory computer readable storage media according to claim 9, wherein the sensor information is WiFi location information.

13. The non-transitory computer readable storage media according to claim 9, wherein the sensor information is accelerometer information.

14. The non-transitory computer readable storage media according to claim 9, wherein the sensor information is battery level information.

15. The non-transitory computer readable storage media according to claim 9, wherein the sensor information is cell ID information.

16. The non-transitory computer readable storage media according to claim 9, further including an intercept of at least a second request from the mobile app to obtain sensor information, retrieving recorded information that corresponds to sensor information at a second time to produce a second substitute reading, and sending the second substitute reading to the mobile app as sensor information.

17. A system comprising: integrated circuits including memory having a log file, a central processing unit, and at least one sensor; an operating system operatively controlling the integrated circuits to form a computerized system having at least one sensor output; a harnessed mobile app that is being tested; and a collector app disposed between the operating system and the harnessed mobile app; wherein the collector app reads the sensor output over time; wherein the collector app records the read sensor output over time into the log file; wherein the collector app intercepts requests from the harnessed mobile app to obtain the sensor output; wherein the collector app retrieves information from the log file in response to the intercepted requests; and wherein the collector app sends the retrieved information to the harnessed mobile app as sensor output.

18. The system according to claim 17, wherein the sensor information is GPS information.

19. The system according to claim 17, wherein the sensor information is cell location information.

20. The system according to claim 17, wherein the sensor information is WiFi location information.

21. The system according to claim 17, wherein the sensor information is accelerometer information.

22. The system according to claim 17, wherein the sensor information is battery level information.

23. The system according to claim 17, wherein the sensor information is cell ID information.

24. A system comprising: integrated circuits including memory having a log file, a central processing unit, and at least one sensor having at least one sensor output; an operating system forming a computerized system from the integrated circuits; a first app being tested, the first app configured for execution on a mobile device; and a second app disposed between the operating system and the first app; wherein the second app records sensor output over time into the log file; wherein the second app intercepts requests from the first app to obtain the sensor output; wherein the second app retrieves information from the log file in response to the intercepted requests; and wherein the second app sends the retrieved information to the first app as sensor output.

25. The system according to claim 24, wherein the sensor information is GPS information.

26. The system according to claim 24, wherein the sensor information is cell location information.

27. The system according to claim 24, wherein the sensor information is WiFi location information.

28. The system according to claim 24, wherein the sensor information is accelerometer information.

29. The system according to claim 24, wherein the sensor information is battery level information.

30. The system according to claim 24, wherein the sensor information is cell ID information.

31. The system according to claim 24, wherein the system comprises a mobile device.

* * * * *